United States Patent
Frederiksen et al.

(10) Patent No.: US 7,615,308 B2
(45) Date of Patent: Nov. 10, 2009

(54) DUAL FUNCTION, BIPOLAR SEPARATOR PLATES FOR FUEL CELLS

(75) Inventors: Henning Frederiksen, Svendborg (DK); Steen Yde-Andersen, Svendborg (DK); Laila Grahl-Madsen, Hesselager (DK); Joergen Schjerning Lundsgaard, Svendborg (DK)

(73) Assignee: IRD Fuel Cells A/S, Svendborg (DK)

( * ) Notice: Subject to any disclaimer, the term of this patent is extended or adjusted under 35 U.S.C. 154(b) by 226 days.

(21) Appl. No.: 10/591,841

(22) PCT Filed: Mar. 3, 2005

(86) PCT No.: PCT/EP2005/002243

§ 371 (c)(1),
(2), (4) Date: Dec. 26, 2006

(87) PCT Pub. No.: WO2005/086273

PCT Pub. Date: Sep. 15, 2005

(65) Prior Publication Data
US 2007/0184328 A1 Aug. 9, 2007

Related U.S. Application Data

(60) Provisional application No. 60/549,593, filed on Mar. 3, 2004.

(51) Int. Cl.
*H01M 2/14* (2006.01)

(52) U.S. Cl. .............................. 429/38; 429/39; 429/34
(58) Field of Classification Search .................. 429/34, 429/38, 39
See application file for complete search history.

(56) References Cited

U.S. PATENT DOCUMENTS

| | | | |
|---|---|---|---|
| 4,292,379 A | 9/1981 | Kothmann | 429/17 |
| 4,469,579 A | 9/1984 | Covitch et al. | 204/283 |
| 4,826,554 A | 5/1989 | McIntyre et al. | 156/280 |
| 5,211,984 A | 5/1993 | Wilson | 427/115 |
| 5,272,017 A | 12/1993 | Swathirajan et al. | 429/33 |
| 5,316,871 A | 5/1994 | Swathirajan et al. | 429/33 |
| 5,399,184 A | 3/1995 | Harada | 29/623.4 |
| 5,472,799 A | 12/1995 | Watanabe | 429/30 |
| 5,474,857 A | 12/1995 | Uchida et al. | 429/33 |
| 5,702,755 A | 12/1997 | Mussell | 427/115 |
| 6,174,616 B1 | 1/2001 | Marvin et al. | 429/34 |
| 6,500,580 B1 | 12/2002 | Marvin et al. | 429/39 |
| 6,503,653 B2 | 1/2003 | Rock | 429/35 |
| 2002/0119359 A1* | 8/2002 | Yamazaki et al. | 429/32 |

FOREIGN PATENT DOCUMENTS

| | | |
|---|---|---|
| EP | 1 220 347 A2 | 7/2002 |
| WO | WO 01/71836 A1 | 9/2001 |

* cited by examiner

*Primary Examiner*—Patrick Ryan
*Assistant Examiner*—Ben Lewis
(74) *Attorney, Agent, or Firm*—Licata & Tyrrell P.C.

(57) ABSTRACT

Dual function, bipolar separator plates are provided for use in fuel cells. These separator plates contain both a cathodic flow field and an anodic flow field in a single separator plate.

2 Claims, 2 Drawing Sheets

DUAL FUNCTION, BIPOLAR SEPARATOR PLATES FOR FUEL CELLS This patent application is the National Stage of International Application No. PCT/EP2005/002243, filed Mar. 3, 2005, which claims the benefit of priority from U.S. Provisional Application Ser. No. 60/549,593, filed Mar. 3, 2004, teachings of which each of which are herein incorporated by reference in their entirety.

FIELD OF INVENTION

The present invention relates to a separator plate for fuel cells that contains both an anode face and a cathode face. Accordingly, in the present invention, a single separator plate can facilitate transport of reactants and heat to and from the reactive surfaces in order to maintain the electrolytic conversion process and to conveniently exhaust the reaction products away.

BACKGROUND OF THE INVENTION

Fuel cells are electrochemical energy conversion devices considered as a possible alternative to internal combustion engines. Fuel cells convert a hydrogen containing fuel such as methanol or hydrogen to electrical energy by an oxidation reaction. A by-product of this reaction is water. Adequate output voltage entails the assembly of multiple fuel cells, connected in series, into fuel cell stacks.

One type of fuel cell comprises a solid polymer electrolyte (SPE) membrane, such as a sulfonated fluorinated polymer membrane material known as Nafion, which provides ion exchange between cathode and anode electrodes. Various configurations of SPE fuel cells as well as methods for their preparation have been described. See e.g. U.S. Pat. No. 4,469,579; U.S. Pat. No. 4,826,554; U.S. Pat. No. 5,211,984; U.S. Pat. No. 5,272,017; U.S. Pat. No. 5,316,871; U.S. Pat. No. 5,399,184; U.S. Pat. No. 5,472,799; U.S. Pat. No. 5,474,857; and U.S. Pat. No. 5,702,755.

A membrane electrode assembly or MEA for the fuel cell is formed by bonding of a cathode catalyst, the solid polymer electrolyte (SPE) layer and an anode. A porous conductive carbon cloth is placed in between each MEA and a separating element. A fuel cell stack of fuel cells connected in series is made by repeating the sequence described above so that a multiplicity of single cells forms the stack.

The separating element serves to transport reactants and products to and from the fuel cell and thus is also often referred to as a flow-plate. The separating element also manages heat output of the fuel cell, by transferring or distributing heat generated by the fuel cell to its surroundings.

Typically, the separating element comprises a separator sandwich formed by placing an anode plate over a cathode plate in the following sequence. The front face of the anode plate serves as the anode separator flow field while the rear face of the anode plate serves as the anode separator face with transfer cavities. The rear face of the anode plate is adjacent to the separator face with transfer cavities of the rear face of the cathode plate. The front face of the cathode plate serves as the cathode separator flow field. Thus, the posterior or rear face of one flow directing separator plate for the anodic process is placed in contact with the posterior or rear face of the corresponding cathodic separator plate. This assembly forms the integral separator sandwich in the conventional cell. Apertures and orifices on the anterior surface of the cathode flow plate and the anode flow plate are arranged so that the appropriate reactants are fed to either the anode surface or the cathode surface via cavities enclosed by the plane surface of the opposing separator plate element. Leakage is prevented by polymeric seals placed in grooves surrounding these cavities.

Since properties of the cathodic and anodic reactants are different, the flow pattern and channel configuration and design are adapted to the particular material being transported to the MEA via the channels in the separator plate. A system of apertures in the separator plates form a common supply channel for each of the reactants and traverses the stack, supplying reactants to each fuel cell via apertures arranged on the appropriate separator plate faces. Thus, an oxidant is supplied to the cathode where reduction occurs and a hydrogen containing fuel such as hydrogen or methanol is supplied to the anode where oxidation occurs.

Separating elements are typically manufactured from conducting carbon composites, such as that supplied as SIGRACET Bipolar Plate BMA 5 by SGL Carbon, Meitingen, Federal Republic of Germany.

The use of separating elements has disadvantages. The foremost is the undesirable replication of parts and the undesirable increase of the volume of the stack and its weight as it is difficult to manufacture very thin plates in the approved materials without steeply increasing quality defects. There is a duplication of elements having very similar functions where differentiation is not required. There is also increased electrical resistance in the cell thus affecting the heat loss due to resistive power dissipation and giving uneven power distribution and reduced output. Further, contact between the plates of the separating elements can deteriorate considerably after extended cell cycling. This deterioration is believed to be caused by chemical and tribiological changes in the contact layer between anodic and cathodic separator plates.

Attempts have been made to address these issues.

U.S. Pat. No. 6,503,653 discloses a bipolar plate assembly for a PEM fuel cell having a serpentine flow field formed on one side and an interdigitated flow field formed on the opposite side. Thus, in this assembly, a single plate serves as both the anode current collector and a cathode current collector of adjacent fuel cells. This bipolar plate assembly further comprises a staggered seal arrangement to direct gaseous reactant flow through the fuel cell such that the seal thickness is maximized while the repeat distance between adjacent fuel cells is minimized.

U.S. Pat. No. 6,500,580 discloses a fluid flow plate for a fuel cell including a first face and a fluid manifold opening for receiving a fluid and at least one flow channel defined within the first face for distributing a reactant in the fuel cell. A dive through hole is defined in and extends through the fluid flow plate. The dive through hole is fluidly connected to the fluid manifold opening by an inlet channel, defined within an opposite face of the plate. The dive through hole and the inlet channel facilitate transmission of a portion of the fluid to the flow channel. A groove, adapted to receive a sealing member, is also defined within the first face and/or the opposite face. The sealing member may comprise a gasket which seals the respective fluid manifolds, thereby preventing leaking of fluid.

WO 01/71836 discloses a plate assembly formed by two separator plates positioned back to back. The separator plates are fitted with fluid channels of grooves, which collectively form what is conventionally termed as the flow field. In this plate assembly, the grooves open out into continuous inlet and outlet openings. A cover, termed a bridge, is placed in the outlet where it opens out and lies flush with the groove surface in order to ensure that a fluid seal is maintained around the flow field domain. As the bridge thickness is less than the separator plate thickness, access for fluid to the flow field is attained via the aperture formed between the anterior face of the bridge and the anterior surface of the corresponding separator plate. Thus, a cavity with a by-pass under the bridge is formed to give fluid access while at the same time a flush sealing surface is presented on the flow-field surface so that efficient sealing can be achieved. A continuous channel or manifold system is formed collectively by the inlets upon assembly of the plates into a stack. All fuel cells in the stack can be adequately supplied with reactants without breaching the seal enclosing the electrochemical cell.

SUMMARY OF THE INVENTION

An object of the present invention is to provide a simplified and integrated separator plate obviating the need to form a separator sandwich by replacing the two dedicated anode and cathode separator plates with a single bipolar separator plate. In a preferred embodiment, the bipolar separator plate of the present invention further comprises an additional set of manifolds as compared to standard separator sandwiches for the inlet and outlet of the two reactant fluids. Preferably a pattern of orifices and reverse side sealing is placed on each edge of the bipolar separator plate so that a second bipolar separator plate can be aligned at a 90 degree angle with respect to the first orifice/reverse side seal. A compact fuel stack can thus be assembled from a sequence of bipolar separator plates.

DETAILED DESCRIPTION OF THE INVENTION

The present invention provides bipolar separator plates for use in a fuel cell that serve the dual function of providing a cathode as well as an anode in a single plate. The separator plates of the present invention thus comprise an anterior cathodic flow field and a posterior anodic flow field, as well as manifolds, preferably positioned on each edge of the separator plate, for flow of reactants from the anterior cathodic flow field to the posterior anodic flow field and vice versa. In a preferred embodiment, the anterior cathodic flow field of the bipolar separator plate is at a 90 degree angle with respect to the posterior anodic flow field of the bipolar separator plate.

Figures 1A, 1B:
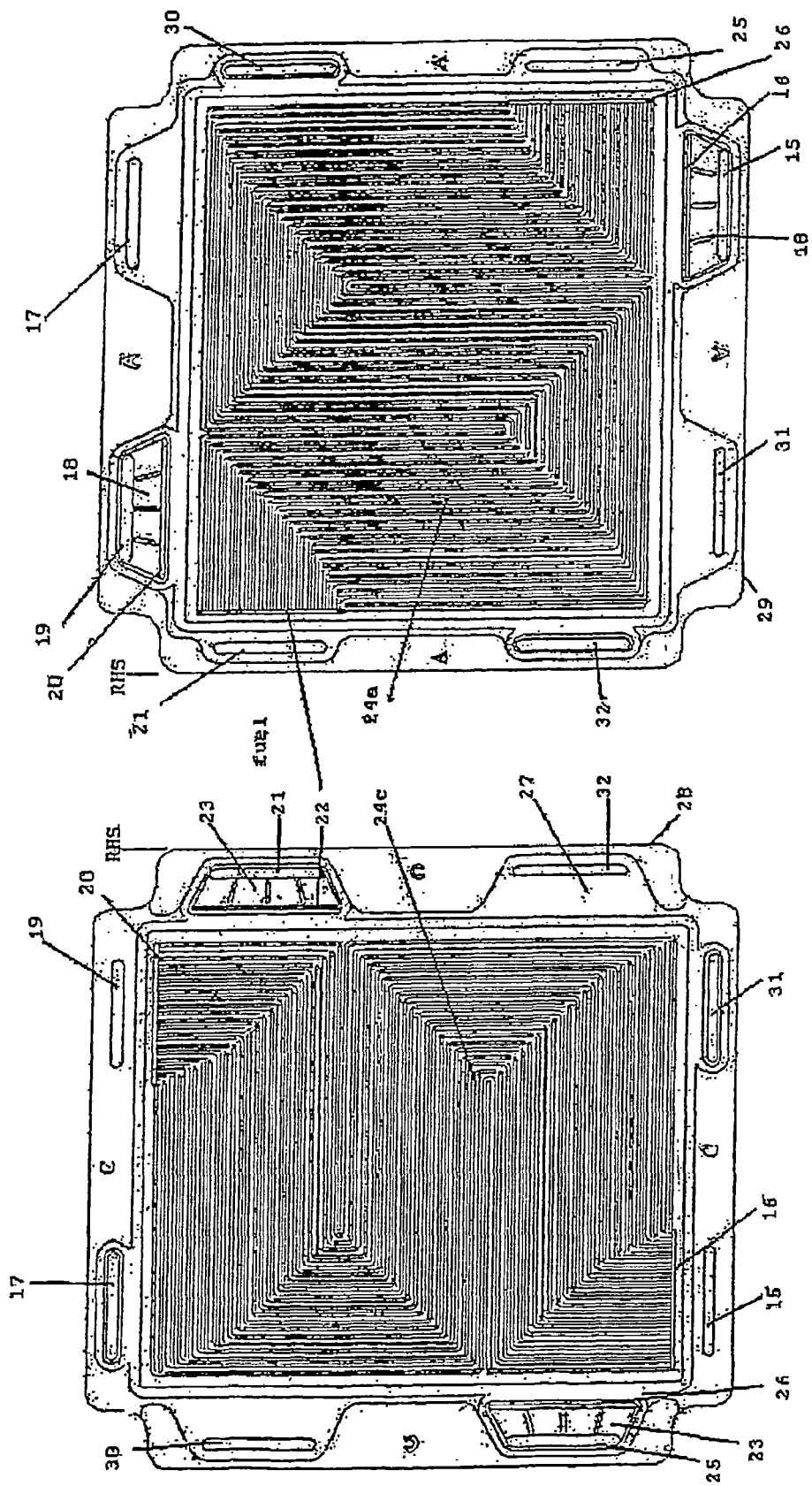
FIGS. 1a and 1b provide diagrams of the anterior cathodic flow field (FIG. 1a) and the posterior anodic flow field (FIG. 1b) of the bipolar separator plate of the present invention. In the embodiment depicted in this figure, interconnected manifolds are positioned on each edge of the plate and the posterior anodic flow field is at a 90 degree angle with respect to the anterior cathodic flow field.

FIG. 1a and 1b provide diagrams of the anterior cathodic flow field (FIG. 1a) and the posterior anodic flow field (FIG. 1b) of a single separator plate of the present invention. In the embodiment depicted in FIG. 1a and 1b, two manifolds each comprising an inlet manifold channel, a reactant transfer cavity and a reactant inlet orifice are positioned at each edge of the separator plate permitting transfer of reactants from the anterior cathodic flow field to the posterior anodic flow field and vice versa. Depending upon the position of the separator plate in the fuel cell stack, the manifold may be active, meaning that the manifold is fitted with an inlet manifold channel, a reactant transfer cavity and a reactant inlet orifice and permits transport of reactants to and from the flow fields on the anterior and posterior of the plate, or passive meaning that the manifold only serves to transport fuel to the next separator plate. When producing a fuel cell stack, it is preferred that a passive manifold of one plate be adjacent to an active manifold of the next plate. As will be understood by one of skill in the art upon reading this disclosure, however, alternative positioning of the manifolds may be used.

FIG. 1a shows the anterior face of the separator plate, which is a cathode 28 with a cathodic flow field 24c, also referred to herein as the anterior cathodic flow field. FIG. 1b shows the opposite posterior face of the same separator plate. This opposite posterior face is an anode 29 with an anodic flow field 24a, also referred to herein as the posterior anodic flow field. In this embodiment of a separator plate of the present invention, the reactant air is fed via an air inlet manifold channel 15 and enters the cathodic flow field 24c via a sealed air entry transfer cavity 18 on the posterior face and enters the cathodic flow field 24c via an air inlet orifice 16. Air flows out of the cathodic flow field 24c via the air outlet orifice 20. The air outlet orifice 20 leads to a sealed air exit transfer cavity 18 on the posterior face or the anode 29 of the bipolar separator. Thus, the sealed air exit transfer cavity 18 provides the function of traversing the flow field seal 50 on the flow field periphery on the opposing face and extends into the air outflow manifold 19.

Fuel is fed from the fuel inlet channel 25 via a similar sealed fuel transfer cavity 23 to the anode 29 of the separator plate and channeled through the flow field 24a. Fuel is exhausted via the fuel outlet orifice 22, the sealed fuel transfer cavity 23 and the fuel outlet channel 21.

The separator plates according to this invention are preferably quadratically modular and dimensionally similar so that a sequence of separator plates of the present invention stacked to make a fuel cell stack are each rotated at an angle of 90° to the preceding plate.

Figure 2:
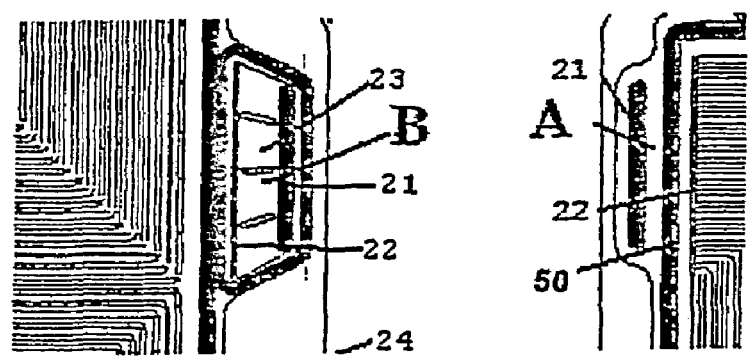
FIG. 2 provides a closer view of a manifold and the material bridge formed by A and B above the cavity formed by elements of the manifold and upon which the transfer cavity seal is placed.

For each reactant supply and outflow, there are preferably two interconnected manifolds so that each inlet and outlet for the two reactants is duplicated. FIG. 2a and 2b shows a closer view of each side of an interconnected manifold and the material bridge on which the transfer cavity seal is placed. The bottom view is depicted in FIG. 2a and the top view is depicted in FIG. 2b. Portions labeled A and B represent the material bridge on which the flow field seal 50 is placed. This material bridge runs over the cavity formed by the elements of the manifold on the opposite face of the bipolar separator plate.

This bipolar separator plate is preferably furnished with a further set of air and fuel inlet and outlet channels, which serve to extend the traversing, manifold system for reactant feed and exhaust. A passive fuel transfer channel, shown as 31 in FIG. 1a and 1b, and a passive fuel transfer channel, shown as 17 in FIG. 1a and 1 merely serve to transport fuel to the next separator plate. Similarly, there is a passive air transfer inlet channel, shown as 32 in FIG. 1a and 1b and a passive air transfer outlet channel, shown as 30 in FIG. 1a and 1b which merely serve to transport air to the next separator plate. The passive air and passive fuel transfer channels of one plate are aligned with active air and fuel transfer channels on the succeeding plate. This enables a geometrically similar separator plate to serve as the succeeding separator plate by mounting it in the stack after a rotation of 90° with respect to the first separator plate.

Figure 3:
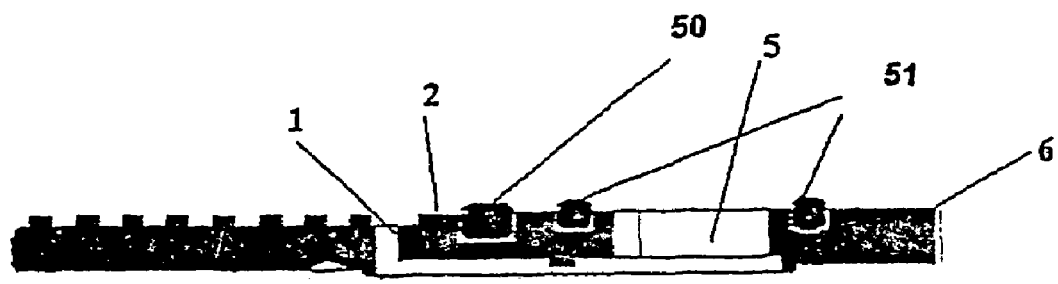
FIG. 3 provides a cross-sectional side view of the cavity formed by the elements of the manifold as well as the material bridge and transfer cavity seal.

A cross-sectional side view of a manifold and material bridge is depicted in FIG. 3. As shown in FIG. 3, the cavity 1 formed by the elements of the manifold is on the reverse side of the bridge 2. The flow field seal 50 is compressed in order to prevent leakage. The compressive forces must be resisted by the material bridge in order to maintain an effective seal 51 over the transfer cavity formed by the elements of the manifold 5. Accordingly, both the rectilinear channel of the anodic and cathodic flow field and the transfer cavities formed on the opposing faces of the bipolar separator plate 6 by elements of the manifold are sealed preferably via polymeric sealing rings molded to fit into appropriately sized and positioned grooves in the plate. Seals of the flow field and the transfer cavities may be separate or may comprise a single integrated seal.

A bipolar plate with only four transfer cavities can be made but in fuel cell stacks comprising the such a simple bipolar plates, with four transfer cavities, the only way to stack a succession of cells is by enveloping the previous outlet domain with transfer cavity seals increasing in size. Increasing size of the seals is required to maintain the feed stock fed from one traversing manifold to the next adjacent fuel cells. This requirement for increasing size of the seals limits the number of fuel cells which can be stacked, particularly since maintaining maximum flow field size is essential to efficiency of the fuel cell stack.

In the bipolar fuel cell stack of the present invention, two sets of manifolds are preferably provided on each plate, one passive and the other active. Further, the manifolds are arranged preferably on all border edges instead of simply two as in standard fuel cells so that the cells can be rotated at a 90 degree angle with respect to the adjacent cell. Thus, the need for increasing transfer cavity seal size can be eliminated with the bipolar separator plates of the present invention when an active manifold is adjacent to a passive manifold.

Accordingly, the present invention provides a single dedicated separator design for fuel cells with both an anode and cathode. Further, by introducing traversing manifolds for fuel supply, exhaust and air supply and exhaust on each side of the quadratic separator plate, a single design can serve in any convenient multiplicity of single cells in the stack. In particular, by rotating the design shown in the FIG. 1 90° for any succeeding separator, an arbitrarily selected number of cells may be separated by one standard bipolar separator plate. Thus, the separator plate design of the present invention reduces the number of separator plates by a factor of two, compared to the conventional design. The result is a reduction of the dead volume of a cell stack and an increase in power density while achieving simplification and reduced costs. A further advantage is that the total pressure drop in transporting the feed stock to the electrolyte is considerably reduced as there are now two strings to supply with approximately half of the original route in the flow-plate grooves. This reduces the drain and loss by driving pumps powered by the stack output.

The bipolar separator plates of the present invention are useful in a fuel cell stack, each stack comprising two or more of the plates of the present invention, and a terminal end plate on each end of the stack. In these fuel cell stacks the terminal end plates are designed with manifolds corresponding and/or aligning with the manifolds on the bipolar separator plate of the present invention.

The invention claimed is:

1. A bipolar separator plate for use in a fuel cell, said separator plate comprising an anterior cathodic flow field, a posterior anodic flow field and two interconnected manifolds for each reactant supply and outflow, for flow of reactants from the anterior cathodic flow field to the posterior anodic flow field and from the posterior anodic flow field to the anterior cathodic flow field, wherein the anterior cathodic flow field is at a 90 degree angle with respect to the posterior anodic flow field, wherein an active manifold and a passive manifold are positioned on each edge of the bipolar separator plate.

2. A fuel cell stack comprising two or more separator plates of claim 1, said separator plates being mounted in the fuel cell stack at a 90 degree angle with respect to each other.

* * * * *